(12) United States Patent
LaGrotta

(10) Patent No.: US 6,574,479 B1
(45) Date of Patent: Jun. 3, 2003

(54) METHOD AND APPARATUS FOR SENDING A MESSAGE TO A PAGER USING A SUBSCRIBER TELEPHONE NUMBER

(75) Inventor: Richard Thomas LaGrotta, Livingston, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/159,026

(22) Filed: Sep. 23, 1998

(51) Int. Cl.[7] ............................. H04Q 7/20; G08B 5/22
(52) U.S. Cl. ..................... 455/458; 455/426; 340/7.25
(58) Field of Search ................... 455/31.1, 31.2, 455/552, 556, 426, 458, 459; 340/825.44, 825.47, 7.1, 7.25, 825.52

(56) References Cited

U.S. PATENT DOCUMENTS

| | | | |
|---|---|---|---|
| 4,713,808 A | | 12/1987 | Gaskill et al. |
| 4,747,122 A | * | 5/1988 | Bhagat et al. ............... 340/7.1 |
| 4,947,420 A | | 8/1990 | Stahl et al. .................... 379/57 |
| 4,951,044 A | * | 8/1990 | Nelson et al. .......... 340/825.44 |
| 5,066,949 A | * | 11/1991 | Breeden et al. ........ 340/825.44 |
| 5,144,648 A | * | 9/1992 | Bhagat et al. ............... 455/31.2 |
| 5,148,469 A | * | 9/1992 | Price .......................... 455/31.2 |
| 5,175,758 A | * | 12/1992 | Levanto et al. ............. 455/458 |
| 5,561,703 A | * | 10/1996 | Arledge et al. ............. 455/31.2 |
| 5,625,884 A | * | 4/1997 | Gitlin et al. ................. 455/127 |
| 5,651,050 A | * | 7/1997 | Bhagat et al. ............... 455/431 |
| 5,703,930 A | * | 12/1997 | Miska et al. .................. 379/57 |
| 5,742,905 A | * | 4/1998 | Pepe et al. ............. 379/211.01 |
| 5,761,271 A | * | 6/1998 | Karnowski ...................... 379/1 |
| 5,805,991 A | * | 9/1998 | Foladare et al. ............ 455/406 |
| 5,839,054 A | * | 11/1998 | Wright et al. ............... 455/31.2 |
| 5,890,065 A | * | 3/1999 | Seo et al. .................... 455/445 |
| 5,901,359 A | * | 5/1999 | Malmstrom ................. 455/461 |
| 5,907,811 A | * | 5/1999 | Foladare et al. ............ 455/459 |
| 5,946,626 A | * | 8/1999 | Foladare et al. ............ 455/456 |
| 6,188,907 B1 | * | 2/2001 | Reding et al. .............. 455/459 |
| 6,275,680 B1 | * | 8/2001 | Martin et al. ............... 340/7.45 |

FOREIGN PATENT DOCUMENTS

| | | | |
|---|---|---|---|
| CA | 2161968 | | 12/1994 |
| CA | 2199802 | | 3/1996 |
| EP | 0212761 | * | 3/1987 |
| GB | 2 308 039 A | * | 6/1997 |
| JP | H06-069872 | * | 3/1994 ............ H04B/7/26 |

\* cited by examiner

*Primary Examiner*—Charles N. Appiah
(74) *Attorney, Agent, or Firm*—Harness, Dickey & Pierce, P.L.C.

(57) ABSTRACT

A paging system in which a subscriber's telephone number is used as the PIN number to identify the subscriber's pager. When a caller places a call to the paging system, the caller enters the telephone number of the subscriber when prompted for a PIN. The paging system performs a database lookup to determine the address of the pager associated with the entered PIN. Alternatively, the entered PIN itself could be used as the address of the pager. Upon identification of the address of the pager, the paging system transmits a message including the address of the pager via radio transmission.

22 Claims, 2 Drawing Sheets

US 6,574,479 B1

METHOD AND APPARATUS FOR SENDING A MESSAGE TO A PAGER USING A SUBSCRIBER TELEPHONE NUMBER

FIELD OF THE INVENTION

The present invention relates to wireless paging systems. More particularly, the present invention relates to a method and apparatus for sending a paging message to a subscriber's paging device using a telephone number of a telephone associated with the subscriber.

BACKGROUND OF THE INVENTION

Paging systems are well known and widespread. Currently, when a subscriber subscribes to a paging service, the subscriber is assigned a personal identification number (PIN). The PIN number is used by people sending paging messages to identify the subscriber to whom the message is to be sent.

For example, a typical paging scenario would be as follows. A caller dials a subscriber's office telephone number: 987-654-3210 and is connected to the subscriber's voicemail because the subscriber is out of the office. The voicemail will typically contain a message such as:

I am currently unavailable to take your call. You may page me by dialing 1-800-123-4567 and then entering my PIN number 3947329.[1]

[1] The use of telephone numbers and PIN numbers herein is for example purposes only and not intended to represent actual telephone numbers or PIN numbers.

The caller then dials the paging system telephone number (1-800-123-4567), enters the subscriber's PIN (3947329) and then enters the message to be sent. The message is typically a numeric message entered using the keys of the callers telephone thus sending DTMF tones to the paging system. Thus, in the typical example, after calling the subscriber's office telephone number and being connected to voice mail, the caller must then remember both the paging system telephone number and the subscriber's PIN number. Often, while listening to a subscriber's voice mail greeting, a caller will write down the paging system telephone number and the PIN number. However, if the subscriber speaks quickly during the voice mail greeting, the caller may miss the PIN number or record it incorrectly. The caller is then forced to place another call to the subscriber's office telephone for the sole purpose of obtaining the correct PIN number.

SUMMARY OF THE INVENTION

In accordance with the invention, a subscriber's telephone number is used as the subscriber's pager PIN number in a paging system. As a result, a caller to the subscriber's telephone number who reaches the subscriber's voice mail can page the subscriber by only recording the telephone number of the paging system, because the caller already knows the subscriber's telephone number. This simplifies the paging of a subscriber after a caller reaches the subscriber's voice mail.

In accordance with one aspect of the invention, upon receipt of the subscriber's telephone number as the PIN number, the paging terminal will access a database to determine the address of the subscriber's pager. The paging terminal will use this retrieved address to send the paging message.

In accordance with an alternate embodiment, the subscriber's telephone number could be the actual address of the subscriber's pager. In this embodiment, upon receipt of the subscribers telephone number as the PIN number, the paging terminal will use that telephone number as the address to send the paging message.

These and other advantages of the invention will be apparent to those of ordinary skill in the art by reference to the following detailed description and the accompanying drawings.

DETAILED DESCRIPTION

Figure 1:
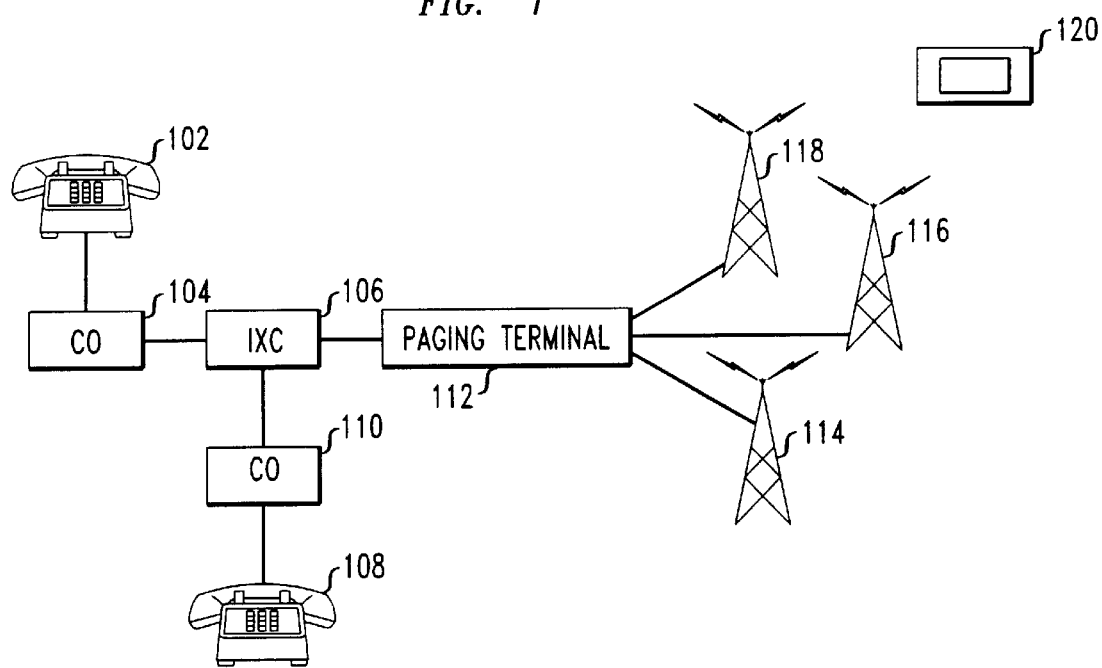
FIG. 1 shows a block diagram of a telecommunication network in which the present invention may be implemented.

FIG. 1 shows a block diagram of a telecommunication network in which the present invention may be implemented. Such a telecommunication network is well known in the art and as such, will only be described in enough detail for an explanation of the present invention. Telephone 102 is connected to central office (CO) 104 and telephone 108 is connected to central office 110. As is well known, a central office is a switching system that terminates local telephone loops and connects the local telephone loops to each other and to trunks which connect to other telecommunication switches, such as interexchange carrier (IXC) switch 106. An interexchange carrier switch is a switching system that is part of a long distance network for providing telecommunication services between local exchanges. Interexchange carrier switch 106 is connected to paging terminal 112. Paging terminal 112 is connected to antennas 114, 116, 118 which transmit radio signals to wireless paging devices, such as pager 120.

When a caller using telephone 102 wishes to communicated with a called party at telephone 108, the following scenario is typical. For purposes of this description, assume that the called party associated with telephone 108 is a subscriber to a paging service and that the subscriber uses pager 120. The caller at telephone 102 will dial the telephone number associated with telephone 108 in order to communicate with the subscriber. The CO 104 receives the dialed digits and routes the call to IXC 106, which in turn routes the call to CO 110. Upon receipt of the call, CO 110 rings telephone 108. Assuming that the subscriber is not present to answer telephone 108, the calling party will typically be connected to a voice mail system. Such a voice mail system may be a stand alone answering machine connected to telephone 108, a voice mail system implemented in a private branch exchange (PBX) located at the customer premises, a voice mail service associated with CO 110, or any other type of voice mail system. Alternatively, instead of a voice mail system, the calling party could be connected to a messaging system which will play a message to the calling party, but does not provide the ability for the calling party to leave a message for the subscriber. Such voice mail and messaging systems are well known in the art and the type of voice mail or messaging system is not pertinent to the description of the present invention. Upon being connected to the voice mail or messaging system, the caller will hear a greeting. A typical greeting which would be appropriate for use in conjunction with the present invention would be as follows:

I am currently unavailable to take your call. You may page me by dialing 1-800-123-4567 and then entering my telephone number as the PIN number.

This message differs from the prior art example message discussed in the background section in that when the caller hears this message, the caller does not have to remember a separate PIN number. Instead, in accordance with the invention, the PIN number assigned to the subscriber is the telephone number of telephone 108, which telephone number was just dialed by the caller, and therefore known by the caller.

Figure 2:
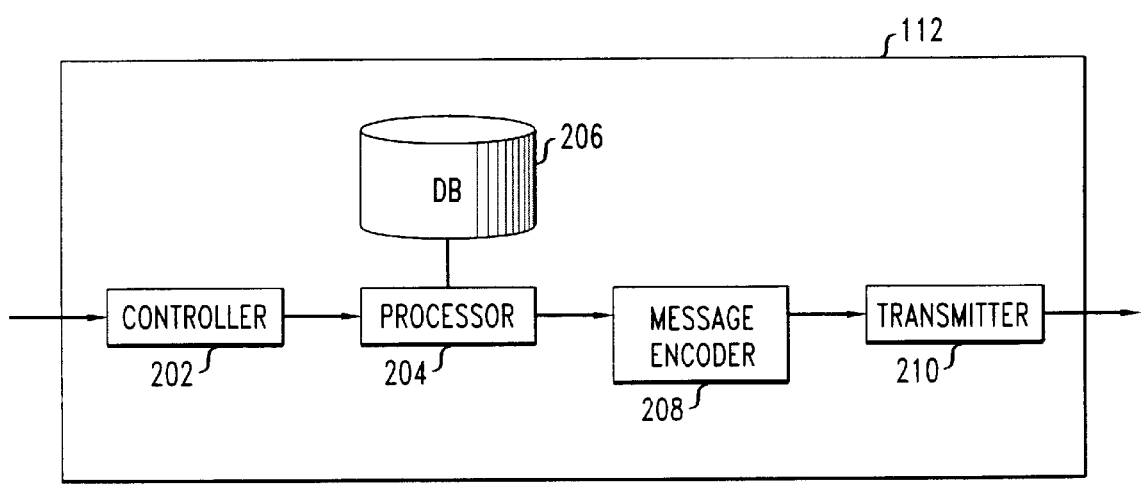
FIG. 2 shows a block diagram of a paging terminal.

Upon receipt of the message, the caller at telephone 102 dials the paging system telephone number. Upon receipt of the dialed digits, the CO 104 routes the call to IXC 106, which further routes the call to paging terminal 112. Paging terminal 112 is shown in further detail in FIG. 2. Controller 202 determines that a call has been received and the microprocessor 204 generates a prompt (e.g. a tone or synthesized voice) indicating that the caller should enter a PIN number. The caller at telephone 102 enters a PIN number, typically through the use of the telephone 102 keypad, thus generating DTMF tones which can be interpreted as digits by the processor 204. In accordance with the invention, the PIN number entered by the caller is the telephone number of the subscriber's telephone 108. Upon receipt of the PIN, the processor 204 will generate another prompt indicating that the caller should enter a message to be sent to the pager. This message is also typically entered using the telephone 102 keypad.

Upon receipt of the PIN and message, the processor will perform a database 206 lookup to determine the address of the pager 102 associated with the entered PIN number. As will be described in further detail below, every pager has a unique address so that it may receive and display only messages addressed to it. The database 206 stores a lookup table associating PIN numbers with pager addresses. Although database 206 is shown as part of the paging terminal 112, in an alternate embodiment, the database 206 could be stored in the telecommunication network external to the paging terminal, in which case the paging terminal would send a request message to the database to retrieve the information from the lookup table.

In accordance with an alternate embodiment of the invention, the PIN number entered by the caller could be the address of the pager. In such a case, there is no need for a database lookup because when the caller enters the PIN number the paging terminal 112 will know the address of the pager.

Figure 3:
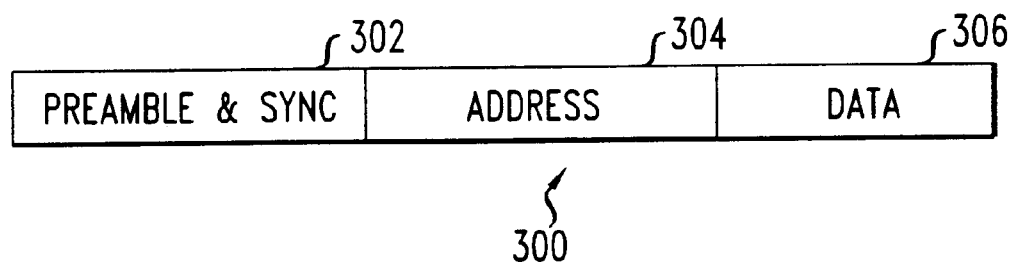
FIG. 3 shows the format of a message sent by the paging terminal.

At this point, the paging terminal 112 knows the address of the pager 120 and the message to be sent. The processor 204 sends the information to message encoder 208 which generates the actual message to be transmitted by the paging system. A typical message 300 is shown in FIG. 3 and includes a preamble and synchronization portion 302, an address portion 304, and a data portion 306. The message 300 is provided to transmitter 210 which generates a radio signal and sends the radio signal to antennas 114, 116 and 118 for over the air broadcasting. Such transmitted signal will be received by pager 120.

Figure 4:
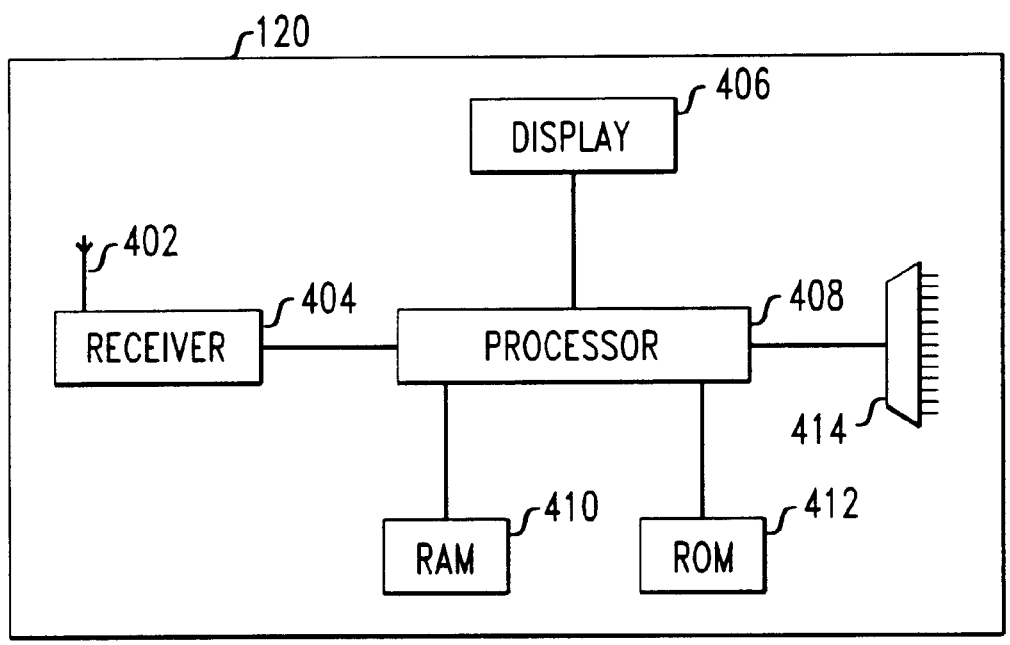
FIG. 4 shows a block diagram of a wireless pager.

Pager 120 is shown in further detail in FIG. 4. The pager 120 receives the radio signals with antenna 402 and receiver 404. Upon receipt, the processor 408 determines whether the address in address portion 304 of received message 300 matches the address of the pager 120 which is stored in ROM 412. If the addresses match, then pager 120 recognizes that the message is intended for the pager and the pager notifies the subscriber that a message has arrived. This may be accomplished, for example, by generating an audio indication (e.g. a tone) using speaker 414, or any other known technique. The data portion 306 of the received message 300 is then displayed in display device 406, which may be for example an LCD display. The received message 300 may also be stored in RAM 410 for later retrieval.

Thus in accordance with the invention, a message may be sent to a subscriber's pager by accessing a paging system and by identifying the subscriber's pager using a telephone number of a telephone associated with the subscriber. Since the caller will typically initially attempt to reach the subscriber by dialing the subscriber's telephone number, the use of that telephone number as the PIN is advantageous because it is already known by the caller. This obviates the need for the caller to remember a different PIN number for the subscriber's pager. In the advantageous embodiment described herein, the telephone number used as the pager PIN is the telephone number of a landline telephone associated with the subscriber. Alternatively, the telephone number used as the pager PIN could be the telephone number of a wireless telephone associated with the subscriber.

It is noted that in order to implement the present invention in a nationwide paging system, the telephone number which is used as the PIN in accordance with the invention should include the three digit area code in order to uniquely identify a pager anywhere within the nationwide paging system. Similarly, to implement the invention in an international paging system, the telephone number which is used as the PIN should include the country code in order to uniquely identify the pager.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the invention could be implemented in conjunction with a wireless telecommunication network, in which case telephones 102 and 108 could be wireless cellular telephones, and CO's 104 and 110 could be mobile switching centers. In such an embodiment, the telephones would communicate with the mobile switching centers via radio base stations. The architecture and functioning of wireless telecommunication networks is well known in the art.

I claim:

1. A method of operation of a paging system for sending a page to a subscriber's wireless paging device using a telephone number of a telephone associated with said subscriber to identify said wireless paging device, said method comprising the steps of:

receiving a telephone call placed to a paging system telephone number;

generating a prompt indicating that a PIN should be entered, the PIN being said telephone number of the telephone associated with said subscriber;

receiving said telephone number of a telephone associated with said subscriber; and transmitting a message to said subscriber's paging device based on said received telephone number, wherein an address of said wireless paging device includes said received telephone number, and wherein said step of transmitting a message further comprises the step of:

transmitting the address of said wireless paging device including said received telephone number.

2. The method of claim 1 further comprising the step of:
performing a database lookup to retrieve an address of said wireless paging device based on said received telephone number; and wherein said step of transmitting a message further comprises the step of:
transmitting the address of said wireless paging device.

3. The method of claim 1 wherein said prompt indicates that the caller should enter said telephone number of a telephone associated with said subscriber.

4. The method of claim 1, wherein the telephone number corresponds to a landline phone associated with the subscriber.

5. The method of claim 1, wherein the telephone number corresponds to a wireless phone associated with the subscriber.

6. The method of claim 1, wherein the telephone number includes the area code and country code of the telephone associated with the subscriber.

7. A paging terminal for sending a page to subscriber's wireless paging device using a telephone number of a telephone associated with said subscriber to identify said wireless paging device, said paging terminal comprising:
a controller for receiving a telephone call placed to a paging system telephone number and for thereafter receiving said telephone number of a telephone associated with said subscriber;
a processor for generating a prompt indicating that a PIN should be entered, the PIN being said telephone number of a telephone associated with said subscriber;
a message encoder for encoding a message to said subscriber's wireless paging device; and
a transmitter for transmitting said message to said subscriber's paging device based on said received telephone number,
wherein an address of said wireless paging device includes said received telephone number.

8. The paging terminal of claim 7 further comprising:
a database storing the address of said subscriber's wireless paging device associated with said telephone number of a telephone associated with said subscriber.

9. The paging terminal of claim 8 wherein said message includes said address of said subscriber's wireless paging device.

10. The paging terminal of claim 7 wherein an address of said wireless paging device includes said telephone number of a telephone associated with said subscriber, and wherein said message includes the address of said wireless paging device including said telephone number of a telephone associated with said subscriber.

11. The paging terminal of claim 7 wherein said prompt indicates that the caller should enter said telephone number of a telephone associated with said subscriber.

12. The method of claim 7, wherein the telephone number corresponds to a landline phone associated with the subscriber.

13. The method of claim 7, wherein the telephone number corresponds to a wireless phone associated with the subscriber.

14. The method of claim 7, wherein the telephone number includes the area code and country code of the telephone associated with the subscriber.

15. A paging system for sending a page to a subscriber's wireless paging device using a telephone number of a telephone associated with said subscriber to identify said wireless paging device, said paging system comprising:

means for receiving a telephone call placed to a paging system telephone number;
means for generating a prompt indicating that a PIN should be entered, the PIN being said telephone number of a telephone associated with said subscriber;
means for receiving said telephone number of a telephone associated with said subscriber; and
means for transmitting a message to said subscriber's paging device based on said received telephone number,
wherein an address of said wireless paging device includes said received telephone number, and wherein said means for transmitting a message further comprises:
means for transmitting the address of said wireless paging device including said received telephone number.

16. The paging system of claim 15 further comprising:
means for performing a database lookup to retrieve an address of said wireless paging device based on said received telephone number; and
wherein said means for transmitting a message further comprises:
means for transmitting the address of said wireless paging device.

17. The paging system of claim 15 wherein said prompt indicates that the caller should enter said telephone number of a telephone associated with said subscriber.

18. The method of claim 10, wherein the telephone number corresponds to a landline phone associated with the subscriber.

19. The method of claim 15, wherein the telephone number corresponds to a wireless phone associated with the subscriber.

20. The method of claim 15, wherein the telephone number includes the area code and country code of the telephone associated with the subscriber.

21. A method of operation of a paging system for sending a page to a subscriber's wireless paging device, an address of said wireless pager device including a telephone number of a telephone associated with said subscriber, said method comprising the steps of:
receiving a telephone call placed to a paging system telephone number;
generating a prompt indicating that a PIN should be entered, the PIN being said telephone number of the telephone associated with said subscriber;
receiving said telephone number of a telephone associated with said subscriber; and
transmitting a message to said subscriber's paging device based on said received telephone number.

22. A paging system for sending a page to a subscriber's wireless paging device, an address of said wireless paging device including a telephone number of a telephone associated with said subscriber, said paging system comprising:
means for receiving a telephone call placed to a paging system telephone number;
means for generating a prompt indicating that a PIN should be entered, the PIN being said telephone number of a telephone associated with said subscriber;
means for receiving said telephone number of a telephone associated with said subscriber; and
means for transmitting a message to said subscriber's paging device based on said received telephone number.

* * * * *